United States Patent
Müller

[11] Patent Number: 5,975,734
[45] Date of Patent: Nov. 2, 1999

[54] ARRANGEMENT FOR MOUNTING A VEHICLE LAMP OR HEADLIGHT

[75] Inventor: Michael Müller, Gifhorn, Germany

[73] Assignee: Volkswagen AG, Wolfsburg, Germany

[21] Appl. No.: 08/951,861

[22] Filed: Oct. 16, 1997

[30] Foreign Application Priority Data

Oct. 23, 1996 [DE] Germany .......................... 196 43 767

[51] Int. Cl.⁶ ...................................................... B60Q 1/00
[52] U.S. Cl. .......................... 362/549; 362/548; 362/459; 116/28 R
[58] Field of Search .................................... 362/523, 382, 362/507, 468, 459, 418, 80, 267, 368, 365, 61, 272, 82, 227, 238, 548, 549, 427, 396; 315/129; D26/28; 116/28 R; 296/23

[56] References Cited

U.S. PATENT DOCUMENTS

| | | | |
|---|---|---|---|
| 3,638,012 | 1/1972 | Lenz et al. | 240/25 |
| 4,408,265 | 10/1983 | Dick | 362/238 |
| 4,485,430 | 11/1984 | Achiaga Fustel | 362/267 |
| 4,722,032 | 1/1988 | Kulka | 362/80 |

FOREIGN PATENT DOCUMENTS

| | | |
|---|---|---|
| 0504626 | 9/1992 | European Pat. Off. . |
| 91159083 | 3/1992 | Germany . |

*Primary Examiner*—Sandra O'Shea
*Assistant Examiner*—I. Negron
*Attorney, Agent, or Firm*—Baker & Botts, L.L.P.

[57] ABSTRACT

A fastening arrangement for mounting a lamp or a headlight in an opening of a vehicle wall part in which there is at least a partial overlap between the lamp or headlight and the edge of the opening and the lamp or the headlight can be fastened to a second vehicle wall part by at least one fastening device pivotally connected to the lamp or headlight so that the lamp or headlight can be retained in the opening in the first vehicle wall part. This makes it possible to fasten lamps or headlights, such as additional brake lights or side indicator lights, between two vehicle wall parts without any need for accessibility between the vehicle wall parts. As a result, it is possible for such lamps to be mounted in vehicle wall parts which border cavities in vehicle parts.

13 Claims, 1 Drawing Sheet

5,975,734

ARRANGEMENT FOR MOUNTING A VEHICLE LAMP OR HEADLIGHT

BACKGROUND OF INVENTION

This invention relates to an arrangement for mounting a lamp or a headlight in an opening of a vehicle wall with an overlap between the lamp or the headlight and the border of the opening.

German Utility Model No. E 91 15 908.3 U1 and European Patent Specification No. 0 504 626 disclose the fastening of an indicator light adjacent to a headlight. In those references, the indicator light is retained in its installation position by a helical spring which is subjected to tensile loading. Fastening of an indicator light in a vehicle cavity which is not accessible from the outside is not possible using an arrangement of that type.

An arrangement for fastening a lamp or a headlight in a vehicle cavity which is not accessible from the outside is not known in the prior art. Consequently, if a lamp or a headlight is to be mounted in an opening in a vehicle wall in a conventional manner, then to provide a sealing surface or for design reasons, the opening must be smaller than the lamp or headlight. Furthermore, for design reasons, if the lamp is arranged in a vehicle cavity and it is necessary to provide a fastening arrangement projecting from the lamp by which the lamp is to be fastened to a second vehicle wall, it may be difficult to introduce the lamp with the fastening arrangement into the opening and then to fasten the lamp in the opening. This causes problems, in particular, if it is not possible to put the installer's hands into the vehicle cavity.

SUMMARY OF THE INVENTION

Accordingly, it is our object of the present invention to provide an arrangement for mounting a lamp or headlight in an opening in a vehicle wall which overcomes disadvantages of the prior art.

Another object of the invention is to provide a way by which a lamp or a headlight can be retained in an opening in a vehicle wall so that it is possible to fasten the lamp or the headlight to a second vehicle wall.

These and other objects of the invention are attained according to one embodiment of the invention by providing a fastening arrangement which is pivotally connected to the lamp or headlight. In order to introduce the lamp or headlight into an opening in a vehicle wall, the fastening arrangement is pivoted so as to move against the lamp or headlight so that the fastening arrangement can be introduced into the opening together with the housing of the lamp or headlight. After introduction, the fastening arrangement pivots into a position in which it can be fastened to a second vehicle wall.

In the fastened position, the lamp or the headlight at least partially overlaps, or is at least partially overlapped by, the border of the opening. A sealant is preferably provided between the overlapping surfaces of the vehicle wall and the lamp or headlight to prevent any moisture or dirt from passing into the opening.

The invention also provides a device by which it is possible to limit the deflection of the fastening arrangement with respect to the lamp or headlight. This device may be a stop which is associated with the lamp or the headlight, with the fastening device or with the second vehicle wall.

Alternatively, a deflection-limiting retaining device or spring device could also be provided between fastening the arrangement and the lamp or headlight.

The fastening arrangement is preferably fastened in an opening in the second vehicle wall in a conventional manner, using a threaded extension and an associated nut. A further embodiment of the invention provides a slot for the opening so that the fastening arrangement can pivot into the slot as it swings down and, at the same time, the slot acts as a deflection-limiting device.

In this case, it is be possible to dispense with the deflection-limiting stop or the retaining means or spring means.

According to another embodiment, a force which acts essentially perpendicularly with respect to the opening in the first vehicle wall is introduced into the lamp or headlight by the fastening arrangement when it is in the fastening position. This provides a good sealing action of the sealant located between the overlapping surfaces of the lamp or the headlight and the edge of the vehicle wall around the opening.

The fastening arrangement may include a resilient member. This allows the lamp or headlight to be fastened between pairs of differently spaced vehicle walls, i.e. in vehicle cavities of different depth.

Light-emitting diodes are advantageously used as light sources. Such light-emitting diodes are very reliable and may thus be mounted in locations which are barely accessible after installation, e.g. in vehicle-part cavities, without being in any way disadvantageous.

Such lamps or headlights usually have a housing and a light cap on the housing. With this structure, the fastening arrangement is expediently included on the housing.

A light-cap surface which is mounted in a surface of the first vehicle wall advantageously follows the contour of the surface of the first vehicle wall. This provides a smooth and homogenous continuous surface.

Examples of lamps or headlights which are arranged in openings in vehicle walls are supplementary brake lights or side indicator lights. In such cases, the vehicle parts are usually body parts forming the outer wall of the vehicle.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
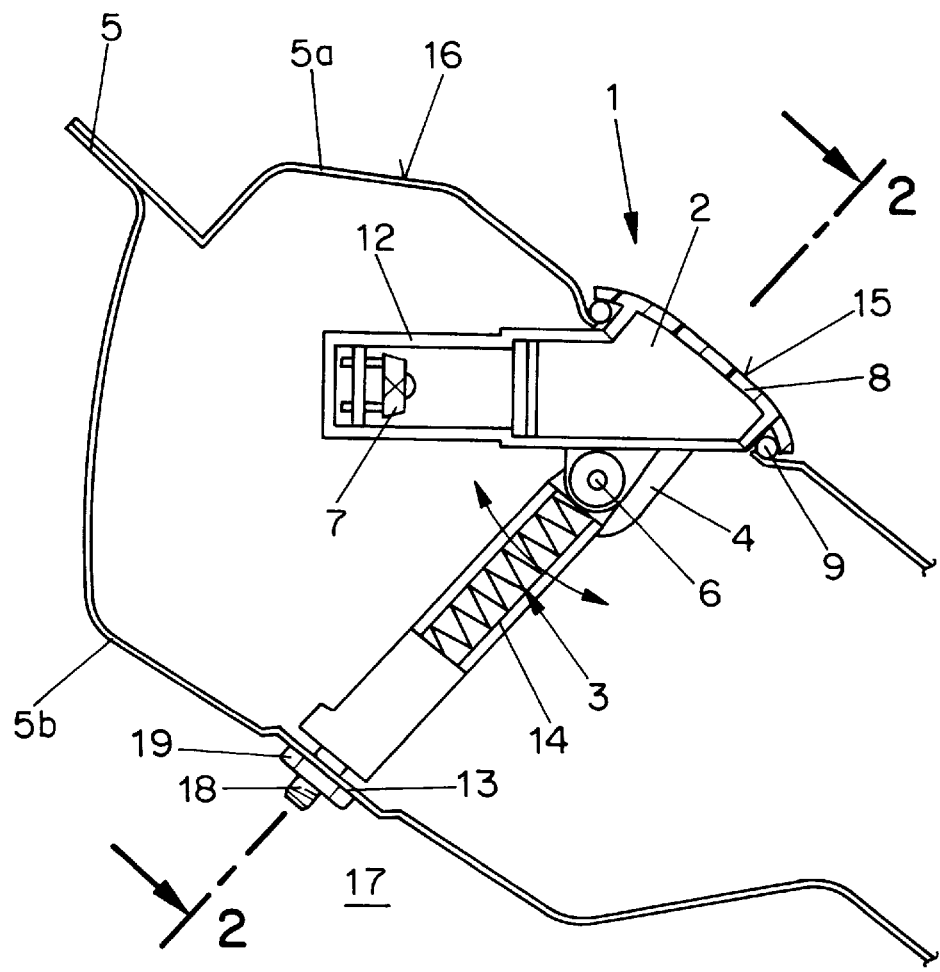
FIG. 1 is a cross-sectional view showing a representative embodiment of a device for fastening a lamp or a headlight in an opening of a vehicle body wall in accordance with the invention.
Figure 2:
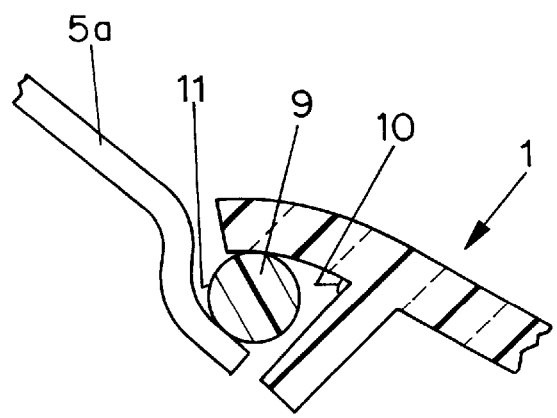
FIG. 2 is a fragmentary sectional view showing a vehicle body wall with an overlapping light cap and a sealant disposed between them.

In the typical embodiment of the invention shown in FIG. 1, a lamp or headlight 1, which will be referred to just as a lamp hereinafter, is positioned in an opening 2 of a first vehicle wall part 5a of a vehicle wall 5. A surface 10 of the light cap overlaps a surface 11 of the first vehicle wall part 5a and a sealant 9 is inserted between the surface 10 and the surface 11. A joint 6, on which a fastening arrangement 3 is pivotably mounted, is affixed to a lamp housing 12. By pivoting against the housing 12, the fastening arrangement 3 can be introduced together with the housing 12 into the opening 2. After the housing 12 is inside the opening, the fastening arrangement 3 can swing down toward a second wall 5b until it rests against a stop 4 on the housing. Of course, it is also possible for the stop 4 to be a part of the fastening arrangement 3 on the second vehicle wall part 5b of the vehicle wall 5 to which the fastening arrangement is fastened. In the position of the fastening arrangement 3 which is defined by the stop 4, the longitudinal axis of the fastening arrangement 3 extends essentially perpendicularly with respect to the plane of the opening 2 of the first wall part 5a. Consequently, a fastening force is introduced from the fastening arrangement into the housing 12 essentially perpendicularly with respect to the plane of the opening 2. This produces a good sealing action of the sealant 9 and a good fit of the lamp 1 in the opening 2.

The overlapping surfaces 10 and 11 act as an abutment for the fastening force which prevents the lamp 1 from slipping through the opening 2. It would also be possible for the edges which contain the overlapping surfaces 10 and 11 to taper or increase a thickness in the direction toward the edge of the opening.

Furthermore, in the position of the fastening arrangement 3 against the stop 4, the projecting end of the fastening arrangement can be received in an opening 13 in the second body wall part 5b in which the fastening arrangement can be fastened. For this purpose, the fastening arrangement 3 has a threaded pin 18 which can be introduced into the opening 13. The fastening arrangement 3 may then be fastened from the opposite side 17 of the second wall part 5b using a nut 19.

It is also possible for the opening 13 to be, for example, in the form of a slot extending parallel to the pivoting motion of the fastening arrangement so that, when the fastening arrangement 3 pivots down, it can be introduced into the slot by the threaded pin 18. In this case, deflection of the fastening arrangement 3 is limited by engagement of the threaded pin 18 with the end of the slot. The stop 4 may thus be dispensed with.

With this arrangement, it is not necessary for a hand to be inserted between the vehicle wall parts 5a and 5b for installation of the lamp.

A resilient member such as a compression spring 14 is preferably provided in the fastening arrangement 3 so that production-related inaccuracies may be compensated and the lamp can be installed between vehicle walls parts 5a and 5b which have different spacings.

Preferably, light-emitting diodes 7 are provided inside the housing 12 of the lamp 1. Such light-emitting diodes 7 are very reliable, with the result that, in contrast to conventional lamps, the lamp only needs to be changed very infrequently.

As shown in FIG. 1, the surface 15 of the light cap 8 follows the contour of the surface 16 of the vehicle wall 5a, i.e. the surface 15 merges continuously into the surface 16.

Although the invention has been described herein with reference to specific embodiments, many modifications and variations therein will readily occur to those skilled in the art. Accordingly, all such variations and modifications are included within the intended scope of the invention.

I claim:

1. A fastening arrangement for fastening a vehicle lamp in an opening of a first vehicle wall part in which there is at least a partial overlap between the lamp and an edge of the wall part comprising, at least one fastening means pivotally connected to the lamp and having a portion be fastened to a second vehicle wall part spaced from the first vehicle wall part and applying a clamping force thereto so as to retain the lamp in an opening in the first vehicle wall part.

2. A fastening arrangement according to claim 1 including a sealant disposed between overlapping surfaces of the first vehicle wall part and the lamp.

3. A fastening arrangement according to claim 1 including limiting means for limiting deflection of the fastening means with respect to the lamp.

4. A fastening arrangement according to claim 3 wherein the limiting means is a stop on one of the group consisting of the lamp, the fastening means and the second vehicle wall part.

5. A fastening arrangement according to claim 1 wherein the fastening means includes means for applying a force on the lamp which acts essentially perpendicularly with respect to the opening.

6. A fastening arrangement according to claim 1 wherein the fastening means can be fastened at a predetermined location in the second vehicle wall part.

7. A fastening arrangement according to claim 6 wherein the second vehicle wall part includes a slot providing the predetermine location.

8. A fastening arrangement according to claim 1 wherein the lamp comprises a plurality of light sources.

9. A fastening arrangement according to claim 8 wherein the light sources are light-emitting diodes.

10. A fastening arrangement according to claim 1 wherein the lamp includes a housing and a light cap and the fastening means is pivotally connected to the housing.

11. A fastening arrangement according to claim 10 wherein the light cap has a surface which follows the contour of a surface of the vehicle wall part.

12. A fastening arrangement according to claim 1 wherein the lamp is one of the group consisting of a supplemental brake light and a side indicator light.

13. A fastening arrangement according to claim 1 wherein the first and second vehicle wall parts form a cavity in a vehicle wall.

* * * * *